United States Patent [19]
Pott et al.

[11] Patent Number: 5,935,622
[45] Date of Patent: Aug. 10, 1999

[54] DEVICE FOR SHAPING A MICROSTRUCTURE SUBSTRATE

[75] Inventors: Wolfgang Pott, Darmstadt; Hans Kragl, Ober-Ramstadt, both of Germany

[73] Assignee: Harting Elecktro-Optische Bauteile GmbH & Co KG, Bad Salzdetfurth, Germany

[21] Appl. No.: 08/810,932

[22] Filed: Feb. 26, 1997

[30] Foreign Application Priority Data

Mar. 6, 1996 [DE] Germany .................. 196 08 667

[51] Int. Cl.⁶ .................................................. B29C 45/66
[52] U.S. Cl. .................. 425/573; 425/450.1; 425/451.2; 425/589; 425/590
[58] Field of Search ..................... 425/573, 589, 425/590, 450.1, 451.2

[56] References Cited

U.S. PATENT DOCUMENTS 2,808,627 10/1957 Venus .
3,671,159 6/1972 Greenberg et al. .
3,897,929 8/1975 Hartmann .
5,087,188 2/1992 Staver .
5,423,670 6/1995 Hamel .

FOREIGN PATENT DOCUMENTS 0 744 276 9/1995 European Pat. Off. .
44 34 832 4/1996 Germany .
1436572 5/1976 United Kingdom .
WO 94/08236 4/1994 WIPO .

OTHER PUBLICATIONS

Klaus Stoeckhert, Mold–Making Handbook, pp. 204–207, 1983.

*Primary Examiner*—Tim Heitbrink
*Attorney, Agent, or Firm*—Kenyon & Kenyon

[57] ABSTRACT

For the shaping of a microstructure substrate via a mold cavity, an unmolding device allows an abrupt, shear-free separation, in particular at reaction temperature, of the microstructure substrate manufactured using the reaction molding method. Optical waveguide components meeting stringent damping requirements can easily be manufactured with this device.

13 Claims, 2 Drawing Sheets

DEVICE FOR SHAPING A MICROSTRUCTURE SUBSTRATE

FIELD OF THE INVENTION

The present invention relates to a device for shaping a microstructure substrate, in particular using the reaction molding method.

BACKGROUND INFORMATION

PCT International No. WO 94-08 236 describes a method for manufacturing an optical cover component for an integrated optical circuit. The optical component is placed in a molding die. Using an injection molding or injection embossing method, a curable liquid is introduced into a desired mold around the optical component and cured. The embedded optical component is then unmolded.

German Patent Application No. P 44 34 832.0 describes a trough-shaped container, which is placed with its opening downward on a molding die, in order to manufacture an integrated optical cover component. A liquid reaction molding compound is introduced into the interior of the trough-shaped container, and is solidified by heating. The cover component is then unmolded.

Microstructured reaction-molded elements commonly have shearing defects whose origin is attributable to a distortion present between the mold insert and the molded element during unmolding. The occurrence of this distortion is attributable to a change over time, between the mold formation time and the mold separation time, in the temperature of the system of plastic + mold insert, since the plastic has a different coefficient of thermal expansion than the metal mold. The shrinkage which occurs in reaction molding has a negative influence on the shaping of the cast element, due to the occurrence of shrinkage cavities.

Microstructures have until now been manufactured principally with the injection-molding method. The "Variotherm" method was developed to overcome the above disadvantages. For technical or commercial reasons, a number of materials that are of great interest for optical applications (crosslinked polymers, including very expensive special halogenated monomers) cannot be processed by injection molding.

SUMMARY OF THE INVENTION

The device according to the present invention makes it possible to shape microstructures, manufactured in particular with the reaction molding method, without the occurrence of the above-mentioned disadvantages such as shearing defects or filament formation. The microstructures that can be manufactured with the device according to the present invention have very high planarity. Shaping errors can be kept to very low levels. By means of a force-applying unit, in particular a spring mechanism, whose spring forces are greater than the forces required for mold separation, microstructures can be separated from a mold cavity abruptly and perpendicularly, in particular at the reaction temperature of the casting compound.

When the sprue gate in the sprue block is constricted, so as to reduce its diameter, in the region of its end facing the frame structure, the sprue block retains the microstructure substrate after polymerization. No additional holding device therefore needs to be provided for the microstructure substrate during separation.

Because the contraction of the casting compound during polymerization is displaced into the sprue gates, no defects such as bubbles or other shrinkage phenomena occur in the substrate. The polymer residues occurring during polymerization in the sprue gates can easily be punched or drilled out.

If a material with a low heat capacity is selected for the sprue block, the heat flow profile over time can be controlled so that the thermal fronts extend from bottom to top on flat surfaces, thus yielding a sediment-like polymerization proceeding from the microstructured surface.

DETAILED DESCRIPTION

Figure 1:
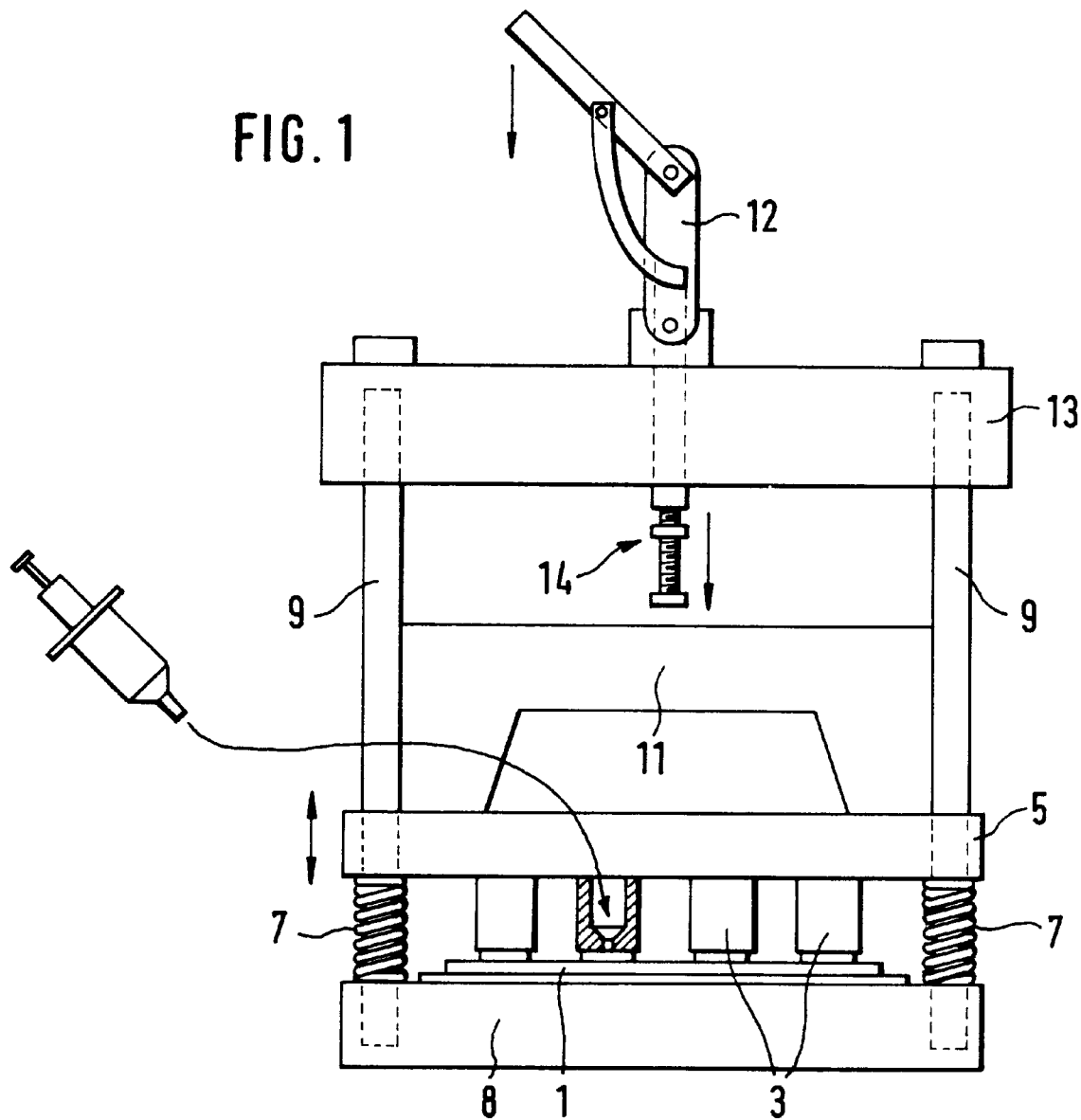
FIG. 1 shows a view of a device according to the present invention.
Figure 3:
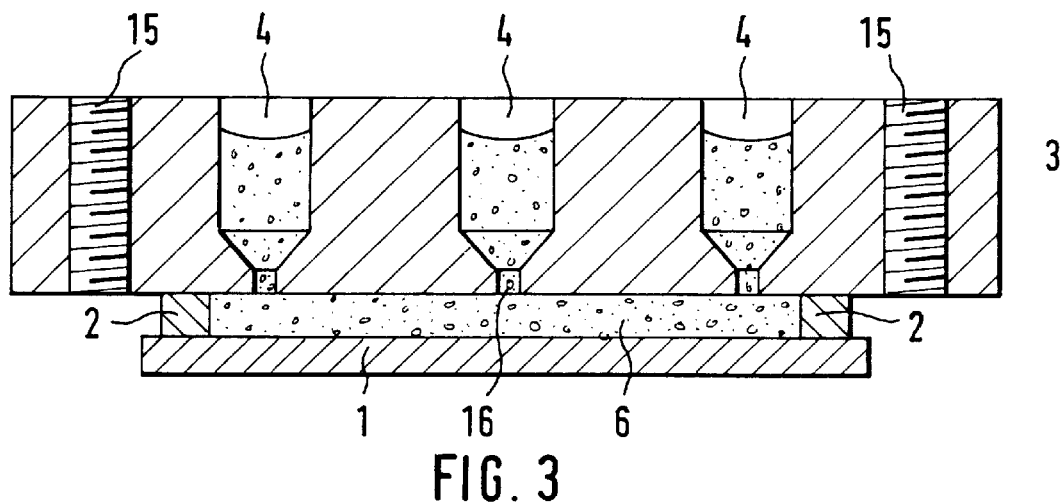
FIG. 3 shows a section through a mold cavity, the casting frame filled with casting compound, and a sprue block.

FIG. 1 shows a view of a device according to the present invention. Fastened onto a base plate 8 is a mold cavity 1 in the form of a nickel sheet or nickel-cobalt sheet, bearing as a negative mask those microstructures that are to be impressed positively onto a microstructure substrate 6. A mold cavity 1 of this kind is usually manufactured from a mask, by galvanic means via a microstructurally etched silicon wafer. Above this mold cavity are located frame structures 2 for the casting compound (see also FIG. 3 and FIG. 4) in the form of flat retaining frames. Located above frame structures 2 in the configuration according to FIG. 1 are multiple sprue blocks 3, arranged next to one another, which each have a sprue gate 4. In the alternative configuration according to FIG. 3, only one sprue block 3 is provided, depicted in section. Sprue block 3 or the sprue blocks are preferably made of steel. A long service life is achieved with this design. In the case of a material with a low heat capacity, for example plastic, it is possible, as mentioned earlier, to control heat flux. Sprue gates 4 act as a reservoir for the casting compound in the form of prepolymers or monomer-containing substances, for example PMMA. The sprue gates are arranged with respect to the respective associated frame structure 2 in such a way that the contraction of the casting compound occurs exclusively in the sprue gates 4.

Figure 2:
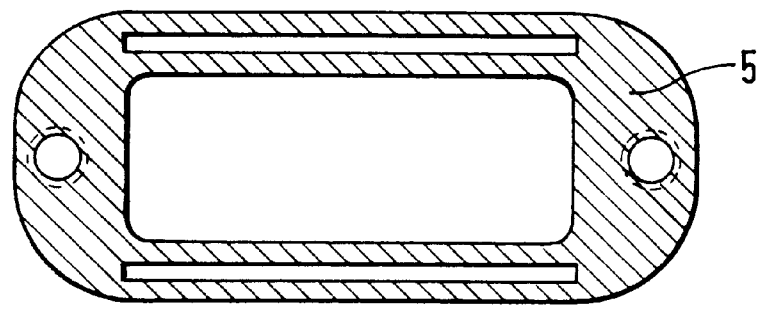
FIG. 2 shows a holddown clamp in section.

Sprue block 3 or the sprue blocks, together with retaining frames 2 fastened thereonto by means of, for example, bolts and threads 15, are pressed and sealed against mold cavity 1 during casting by means of a holddown clamp using, for example, a toggle lever/spring mechanism as the force-applying unit. A constant compression force can, of course, also be achieved by other means, for example using pneumatic, hydraulic, mechanical, and/or electrical mechanisms. Holddown clamp 5, depicted in section in FIG. 2, can be pressed vertically downward by a toggle lever 12 via a spacer 11. In this position, toggle lever 12 is locked in place for the casting operation. Toggle lever 12 is arranged in the center of a top plate 13 that is rigidly joined to base plate 8 via two retaining bars 9. In the locked position, toggle lever 12, via its pressure rod 14 guided vertically in top plate 13, presses sprue block(s) 3, together with frame structures 2 fastened beneath it, against mold cavity 1. The downward pressure of holddown clamp 5, which is guided in the vertical direction by retaining bars 9, occurs against the spring force of two compression springs 7 which are also guided by retaining bars 9.

The casting compound, i.e. the prepolymer, is introduced under pressure, a constriction 16 of sprue gates (e.g., an injection device or a nozzle), into respective reservoirs (sprue gates 4). After distribution of the liquid casting compound into frame structure 2, polymerization is initiated by heating base plate 8, and therefore also the casting compound, with a heating system. Depending on the composition of the casting compound, polymerization and thus solidification into a microstructure substrate 6 occur at a reaction temperature between 30 degrees C and 300 degrees C. Unmolding occurs abruptly by releasing the toggle lever/spring mechanism. Because of the return forces of compression springs 7, sprue block 3, along with frame structure(s) 2 fastened thereon in which the polymerized casting compound has solidified, is separated abruptly from mold cavity 1, still at reaction temperature, vertically upward and with no shearing or filament formation. Intermediate cooling, as in the case of conventional devices, is therefore not necessary. Because of the constriction 16 of sprue gates 4, or another type of undercut in the region of their ends facing toward frame structure 2, the polymerized microstructure substrate 6 shaped by mold cavity 1 cannot be detached out of frame structure 2 or the sprue block, since the polymer residues deposited above the constrictions retain microstructure substrate 6 in frame structure 2 and in the sprue block.

Figure 4:
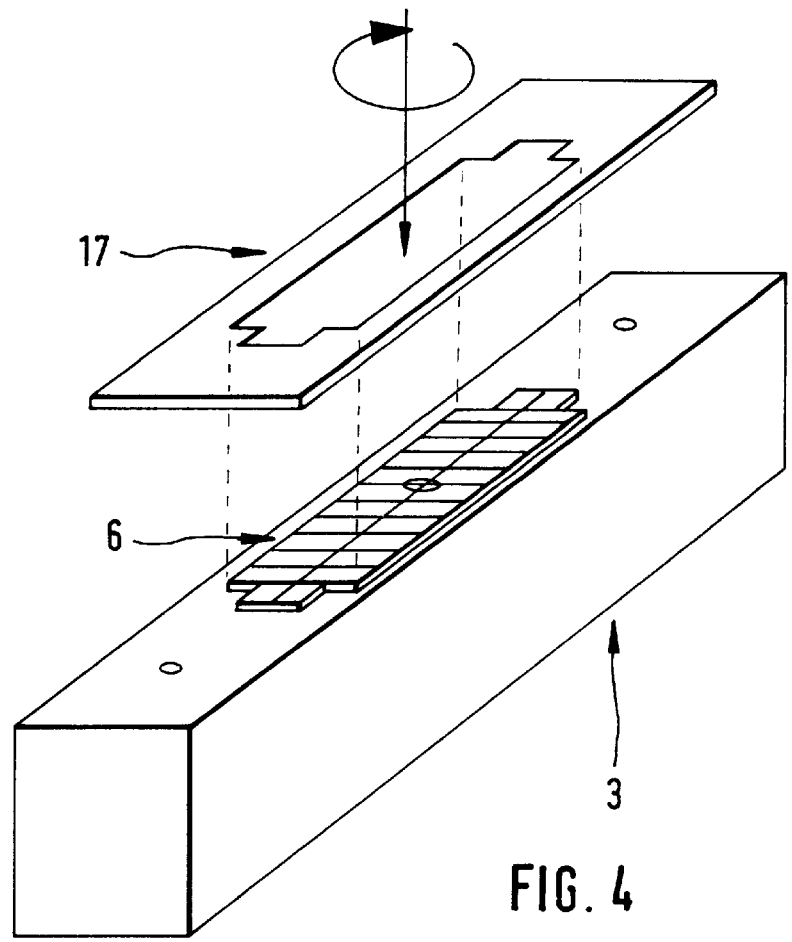
FIG. 4 shows a microstructure substrate on a sprue block and a tool for separating the substrate and sprue block.

FIG. 4 shows a microstructure substrate 6, still being held by sprue block 3, before it is separated from sprue block 3 by means of a frame-shaped tool 17. A punched-out aluminum plate can be used as tool 17 (see arrows in FIG. 4).

Microstructure substrate 6 can also be separated from sprue block 3 by drilling out the shrinkage residues up to the region of the constrictions. Any irregularities which then still remain can be sawn or ground off.

When a nickel sheet is used as the mold cavity, mold cavity 1 can be fastened magnetically onto base plate 8. This fastening can, of course, also be achieved mechanically, for example by spot welding or by adhesive bonding. Magnetic fastening of mold cavity 1 has the advantage that it is protected from warping.

A modification can be achieved by the fact that in contrast to the exemplary embodiment depicted in FIG. 1, compression springs 7 are placed not on base plate 8 but on the outer regions of mold cavity 1. Mold cavity 1 is then automatically pressed against base plate 8 when the toggle lever arm is pressed down. To ensure that mold cavity 1 does not also rise upward when the toggle lever/spring mechanism is released, it can be joined, preferably in the region of sprue block 3, to base plate 8 by spot welding or by other aforementioned fastening methods.

The device according to the present invention can be used, for example, to manufacture optical waveguide components which meet stringent damping requirements, i.e. exhibit no bubbles, shearing defects, or filament formation.

Frame structure 2 can either be removed from microstructure substrate 6 or can remain on microstructure substrate 6, in particular if it is made of plastic and if further technology steps require this.

What is claimed is:

1. A device for shaping a microstructure substrate composed of a plastic material, comprising:
    a mold cavity;
    at least one sprue block for pressing against the mold cavity in response to a force-applying unit;
    a frame structure for a casting compound, the frame structure being fastened on a side facing the mold cavity, the frame structure being joined to the sprue block during casting; and
    an unmolding device for providing abrupt, shear-free separation of the microstructure substrate from the mold cavity, at a reaction temperature.

2. The device according to claim 1, further comprising at least one sprue gate acting as a reservoir for the casting compound, a contraction of the casting compound occurring exclusively in the reservoir.

3. The device according to claim 2, wherein the sprue gate narrows toward the frame structure.

4. The device according to claim 2, wherein the sprue gate has an undercut in a region of an end facing of the sprue gate, toward the frame structure.

5. The device according to claim 1, further comprising a base plate, the mold cavity being fastened on the base plate.

6. The device according to claim 5, further comprising a heating system for heating the casting compound to the reaction temperature, the base plate carrying the heating system.

7. The device according to claim 1, wherein the mold cavity includes a nickel plate.

8. The device according to claim 1, wherein the mold cavity includes a nickel-cobalt plate.

9. The device according to claim 1, wherein the casting compound includes at least one of a prepolymer and a monomer-containing substance that polymerizes when a temperature is raised.

10. The device according to claim 1, wherein the microstructure substrate is shaped to form an optical waveguide component.

11. The device according to claim 1, wherein the microstructure substrate is molded from the plastic material using a reaction molding technique.

12. A device for shaping a microstructure substrate composed of a plastic material, comprising:
    a mold cavity;
    at least one sprue block for pressing against the mold cavity in response to a force-applying unit;
    a frame structure for a casting compound, the frame structure being fastened on a side facing the mold cavity, the frame structure being joined to the sprue block during casting;
    an unmolding device for providing abrupt, shear-free separation of the microstructure substrate from the mold cavity, at a reaction temperature;
    at least one compression spring; and
    a toggle lever for pressing the sprue block onto the mold cavity against a spring force of the compression spring and for separating, upon release, the sprue block from the mold cavity, along with the shaped microstructure substrate, in a perpendicular, shear-free fashion, by a return force of the compression spring.

13. The device according to claim 12, wherein the microstructure substrate is molded from the plastic material using a reaction molding technique.

* * * * *